United States Patent [19]

Cooper, III

[11] Patent Number: 5,325,993
[45] Date of Patent: Jul. 5, 1994

[54] METHOD AND APPARATUS FOR DISPENSING CUP-LIKE MEMBERS FROM A NESTED STACK

[76] Inventor: Clayton C. Cooper, III, 5 Captains Blvd., Waterford, N.Y. 12188

[21] Appl. No.: 980,574

[22] Filed: Nov. 23, 1992

[51] Int. Cl.⁵ .............................................. B23Q 7/04
[52] U.S. Cl. ..................... 221/211; 221/223; 271/104; 271/107
[58] Field of Search .............. 221/211, 210, 278, 272, 221/36, 223, 251, 221; 271/90, 99, 104, 107

[56] References Cited

U.S. PATENT DOCUMENTS

| | | | |
|---|---|---|---|
| 2,849,847 | 9/1958 | Anderson | 221/211 |
| 3,090,523 | 5/1963 | Packman | 221/211 |
| 3,540,621 | 11/1970 | Pilliner | 221/211 |
| 4,351,518 | 9/1982 | Stievenart | 221/211 |

FOREIGN PATENT DOCUMENTS 683953  9/1979  U.S.S.R. .............. 221/211

*Primary Examiner*—Kenneth W. Noland

[57] ABSTRACT

Apparatus for effecting selective withdrawal of cups and the like in which bakery products such as muffins or cupcakes are baked, wherein each cup nested in a stack is subjected to a suction within the cavity defined by the cup to cause the sidewall thereof to move away from the next cup in the stack while being moved from the stack, and providing positive air pressure between and around the sidewall of any such next cup which is frictionally engaged to the cup being withdrawn, thereby to force such next cup out of frictional engagement and back into its nested position.

5 Claims, 3 Drawing Sheets

METHOD AND APPARATUS FOR DISPENSING CUP-LIKE MEMBERS FROM A NESTED STACK

BACKGROUND OF THE INVENTION

Bakery products such as muffins, cupcakes, pound cake and the like are usually baked in a fluted paper shell which is specially treated to withstand baking temperatures and ready release from baking tins or receptacles. While various attempts have been made to provide automatic machinery to dispense such paper shells, such attempts have been only marginally successful. It will be understood that to automate the dispensing of such shells, liners or cup-like members is particularly difficult since a nested stack of several hundred such members, each fluted cup nested within the next adjacent, tends to be tightly and frictionally bound. Furthermore, when a cup is extracted from the stack, the next adjacent cup or cups usually are dislodged due to such frictional engagement and more than one such cup will be dispensed.

As mentioned, attempts to automate the dispensing process have been made, for example, U.S. Pat. No. 3,540,621 illustrates such an attempt; however, this equipment will not consistently dispense only one cup, shell or member at a time, over long periods of time.

There is a vital and universal need for reliable automatic cup dispensing equipment in the baking industry. In addition to factory use by baking companies, inexpensive, reliable equipment of this type is also needed in nearly every bakery. The unfortunate fact is that such paper shells are at the present time dispensed manually in factories and in bakeries alike. The present invention provides simple, foolproof and reliable automated equipment which solves this problem.

SUMMARY OF THE INVENTION

In accordance with the present invention, method and apparatus are herein disclosed for individually separating nested cup-like members from a stack thereof, wherein the stack is first secured, for example, in a refillable magazine having an open end and wherein the interior cavities of the nested shells or cups face the open end of the magazine. The cup or shell nearest the magazine opening is retained therein by means such as a plurality of circumferentially arranged fingers which extend radially into the magazine opening. The cups or shells used in baking are usually frusto-conical with the open end of each such member having a larger dimension than its base.

In accordance with the present invention, the dispensing/extraction process is initiated by the insertion of a suction means (in the illustrated embodiment, a cylinder) having suction ports in an annular pattern arranged about that portion of the cylinder which is inserted within the interior of each cup. The cylinder is of a slightly smaller diameter than the base diameter of a cup or shell so that when suction is applied the diverging sidewall of the cup will be drawn inwardly toward the cylinder. This effectively reduces the width of the shell so that it may pass through the opening in the magazine. However, the nested cups are generally tightly engaged, each adjacent one within the next adjacent one, so that engagement of the suction means with the cup nearest the opening usually causes at least the next adjacent cup to be pulled from the stack at the same time. To solve this problem, the invention uniquely provides positive air flow directed externally of the cup engaged by the suction source which separates the cup so engaged by the suction means from the next adjacent one or ones thereof. The positive flow furthermore will not only separate the respective members but will force the next adjacent members back into the magazine to await their respective turn to be withdrawn. Additionally, the apparatus of the invention utilizes the suction means and positive air pressure means respectively to assist in the transport of each cup or shell to a baking receptacle or a conveyor, and for dispensing each cup into a cavity provided therein.

DESCRIPTION OF THE PREFERRED EMBODIMENT

Figure 1:
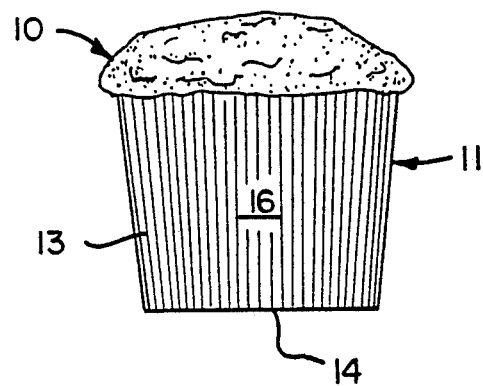
FIG. 1 illustrates a muffin or cupcake in its paper liner or shell, the dispensing of which is the subject of the present invention.

Referring to the drawing, FIG. 1 illustrates a bakery product (muffins or cupcake) 10 which has been baked within a fluted shell or cup 11. The cup 11 is conventionally made of paper which has been specially constructed and treated to withstand the temperatures of the baking process and to permit ready release of the product 10 and the surrounding cup 11 from the receptacle 12 (FIG. 7) in which it is baked. The present invention concerns automatic, sequential dispensing of large numbers of such cups 11 (or functional equivalents) individually from a nested stack into bakery receptacles, baking platforms or the like.

FIGS. 2–7 illustrate a plurality of such cups 11 which are so dispensed in accordance with the present invention. Each cup 11 has been manufactured to have a fluted or crimped sidewall 13 and a flat base 14 which define a cavity 16 generally frusto-conical in shape. Cups 11 are uniform in size and shape and thus may be nested each within a next respective cavity 16 to form a stack 17 which may include several hundred cups 11. It will be understood that in such an arrangement, the fluted sidewalls 13 of adjacent cups 11 tightly engage and greatly inhibit individual automatic separation of each cup 13 from a stack 17 thereof.

The stack 17 of cups 13, as illustrated, is held within a magazine 18 comprising a plurality of rods 19 which circumferentially surround sidewalls 13. The magazine 18 has a base plate 20 which is removable so that additional cups 13 may be added from time to time to fill the magazine as cups are dispensed therefrom. At the opposite end of the magazine, rods 19 are permanently connected to a plate 21 defining a circular opening 21a therein which permits egress of cups 13 therefrom.

Fingers 22 (four to six) are attached to plate 21 and extend radially inwardly within opening 21a. Fingers 22 effectively operate to restrict the diameter of opening 21a to assist in the sequential individual withdrawal from magazine 18 of cups 13 by the cup separation and dispensing apparatus 25.

Apparatus 25 includes a central, hollow cylindrical section 26 which preferably includes a suction source known as a vortex generator 27. Section 26 defines one end 26a which as illustrated may be inserted within a downwardly facing cavity 16 of the lowermost cup 13 within stack 17. Preferably, the diameter of section 26 is essentially the same (allowing for tolerances) as the diameter of each cup base 14. Section 26a defines a plurality of annular ports 28 which are connected to the vortex generator 27.

Apparatus 25 includes a hollow, annular ring 29 which as illustrated is connected to an external source of air pressure which directs a controllable flow of air pressure into ring 29. Ring 29 defines a plurality of ports 29a for the direction of air flow therefrom upwardly and parallel to the longitudinal axis of section 26a.

Figure 2:
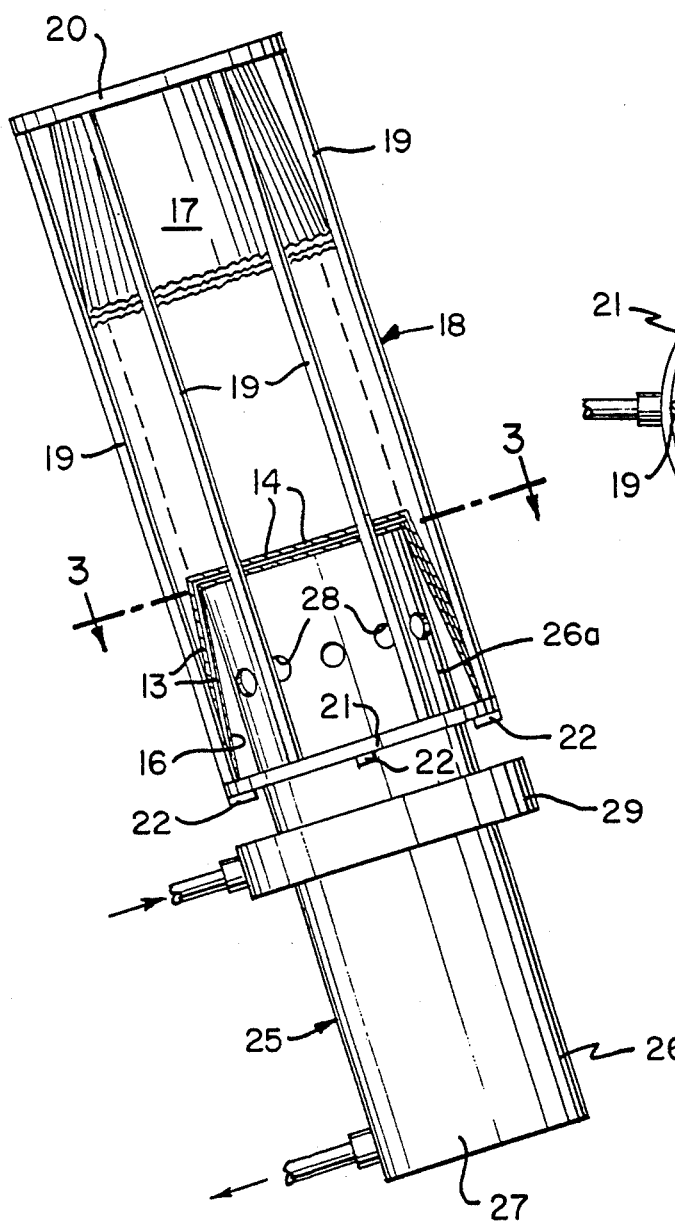
FIG. 2 illustrates an apparatus constructed according to the present invention in the initial phase of dispensing cup-like shells nested in a stack and retained in a magazine.
Figure 3:
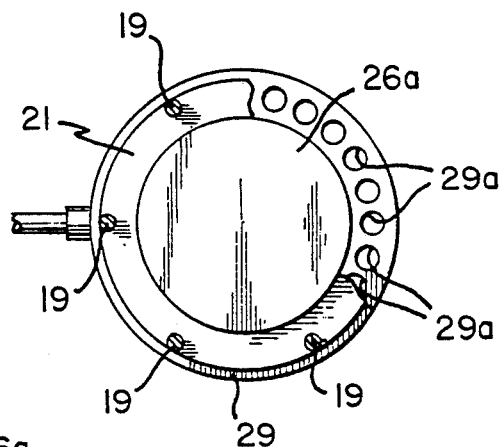
FIG. 3 is a view taken in the direction of arrows 3—3 of FIG. 2.
Figure 4:
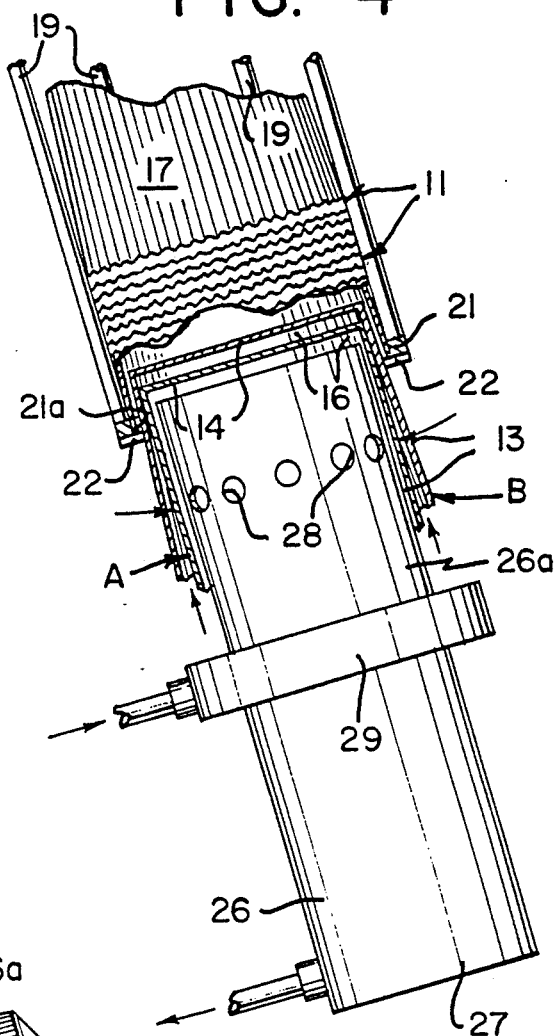
FIG. 4 illustrates the apparatus of the invention as such apparatus progressively withdraws a cup-like shell from the magazine.
Figure 5:
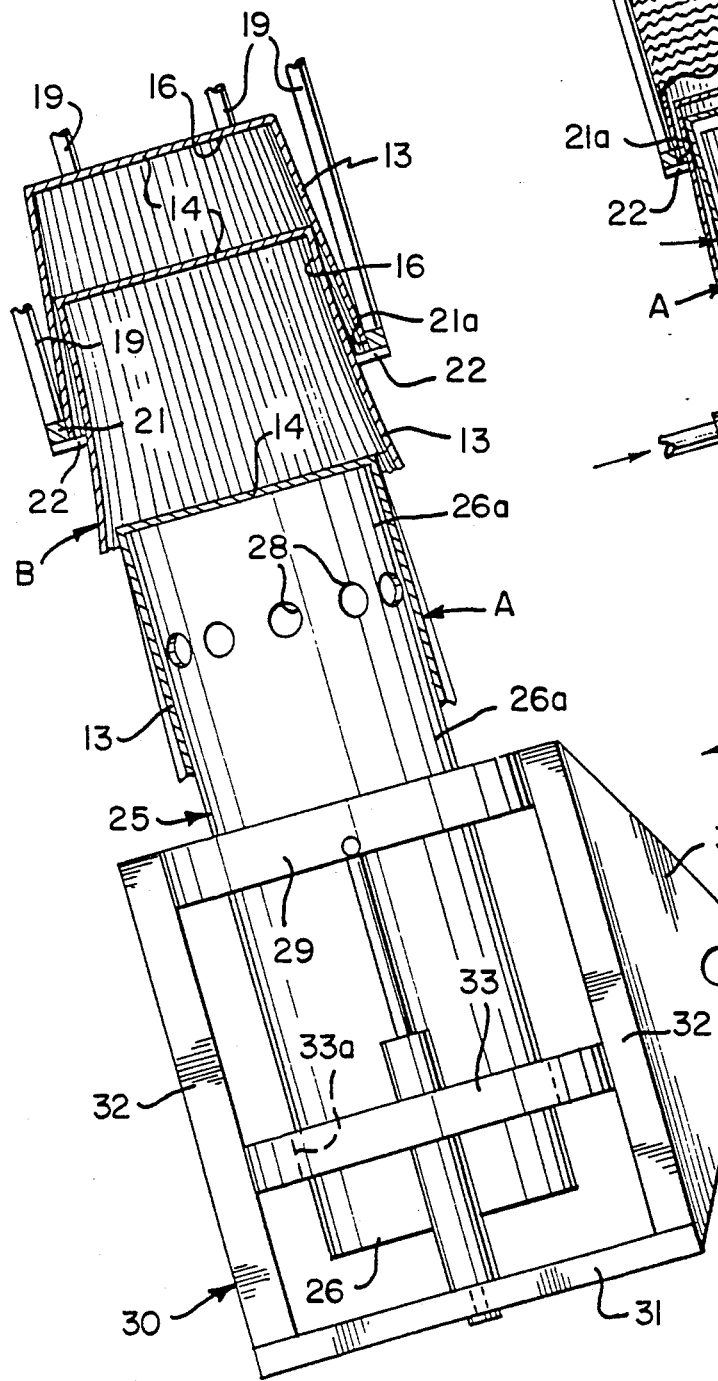
FIG. 5 illustrates the final phase of withdrawal of a shell and apparatus for moving the withdrawal means.

FIGS. 2-5 illustrate the cup dispensing apparatus 25 as it operates to withdraw an individual cup 13 from stack 17 and magazine 18. For simplicity, the means for moving the apparatus 25 toward and away from magazines 18 has been shown in FIG. 5 and shall be described later. Referring to FIG. 2, section 26a has been shown having been inserted within the cavity 16 of the cup nearest to the opening 21a in magazine 18. It will be noted that without suction being applied from ports 28, the sidewall 13 of such cup rests upon fingers 22 which prevent such cup from moving from the magazine. However, it will be seen that when suction is initiated, the walls of a cup 13 surrounding section 26a will be pulled toward (FIG. 4) and against (FIG. 5) the surface of section 26a to permit a cup 13 to be withdrawn from magazine 18 as cylinder 26 is moved away from magazine 18. FIGS. 4 and 5 show how apparatus 25 solves withdrawing a single cup A from magazine 18 notwithstanding the fact that a next adjacent cup B has, due to frictional contact, been partially withdrawn from magazine 18 at the same time. The withdrawal force acting on cup A is suction provided by ports 28, whereas the withdrawal force acting on cup B is contact between the sidewalls 13 of cups A and B. Positive air pressure from ports 29a in ring 29 will act in two ways upon cup B to a) separate the frictional engagement between the respective sidewalls of cups A and B and b) to drive cup B back into magazine 18. As indicated in FIG. 4, pressure from ports 29a shall flow between the engaged sidewalls and also outside the sidewall of cup B, the latter acting aerodynamically in concert with pressure between the respective sidewalls. As shown in FIG. 5, the upward pressure from ports 29a has driven cup B away from cup A and into the magazine where further upward pressure will force the lower edge of cup to rest upon and be restrained by fingers 22 until the next dispensing cycle has begun.

Referring to FIG. 5, apparatus 25 is provided movement in two directions within carriage 30 comprising a base 31 rigidly secured to longitudinal members 32 at one end. The opposite ends of such members slideably engage and laterally support ring 29. Plate 33 is attached to members 32 and has been provided with a circular opening 33a to permit retraction therethrough of section 27 of apparatus 25 by piston and piston rod 34 and 35. Such movement shall be automatically controlled by sensors well-known in the art. The second kind of movement of apparatus 25 provided by carriage 30 is rotation of apparatus 25 from and to the respective positions of FIG. 2 and FIG. 7. To accomplish such rotation carriage 30 is connected by a bracket 36 to rotary actuator 37 which shall be secured to stationary adjacent structure (not shown).

Figure 6:
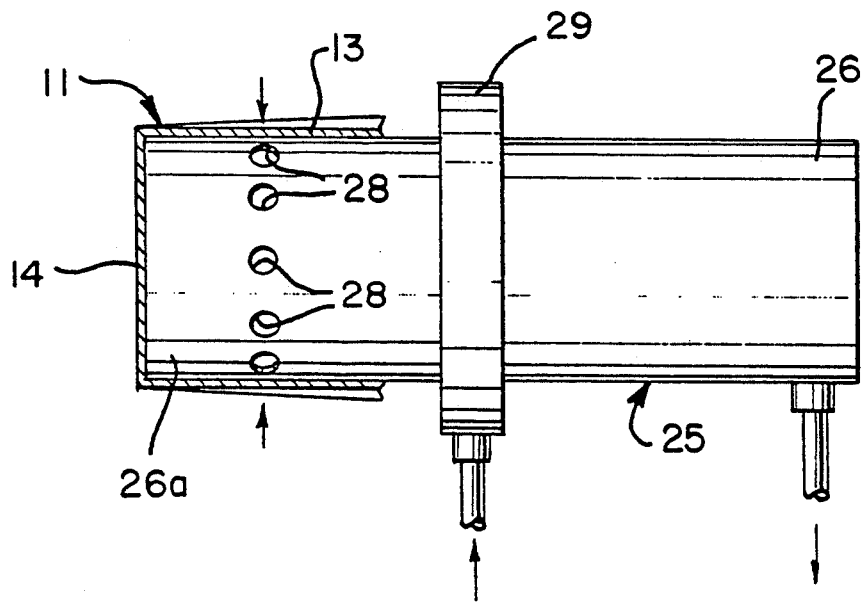
FIG. 6 illustrates an intermediate position of the shell withdrawal apparatus.
Figure 7:
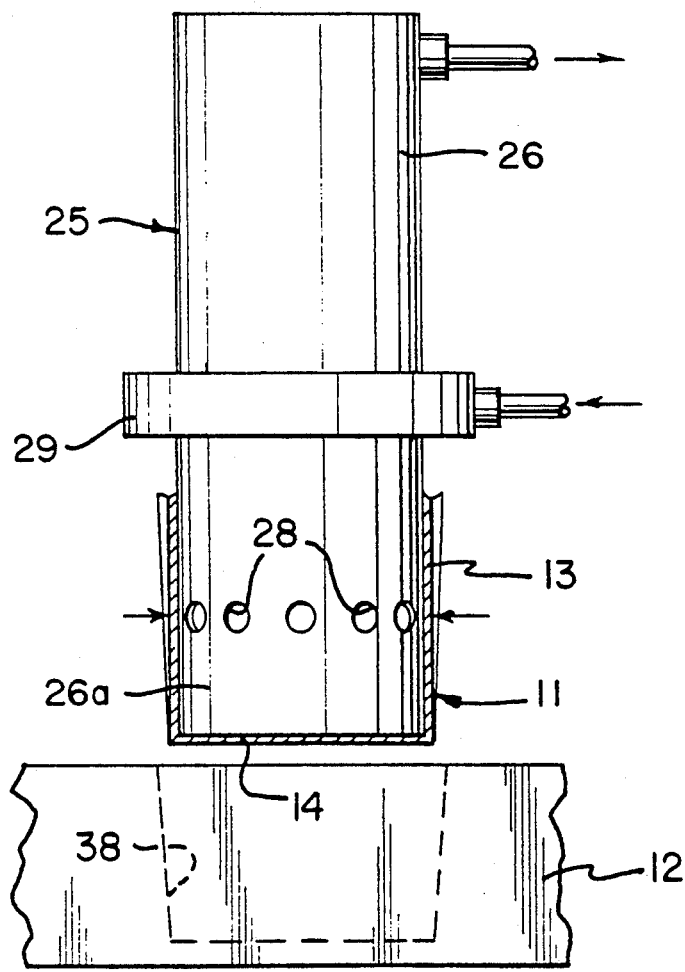
FIG. 7 illustrates the shell dispensing position of the apparatus of the invention.

FIG. 6 illustrates rotation of apparatus 25 from the position of FIG. 5 (full withdrawal from magazine 18 to an intermediate position). FIG. 7 illustrates further rotation of such apparatus to a position in which it shall dispense a cup 13 into a receiving cavity 38 in a receptacle 12. In order to do so, suction from ports 28 shall be discontinued which will cause cup 13 to begin to assume its original frusto-conical shape (see dotted outline). Simultaneously, positive pressure will flow from ports 29a to literally "blow" cup 13 into cavity 38 completing the dispensing cycle.

It will be understood that the foregoing description has been of a particular embodiment of the invention and has been representative as to the shape of the members being dispensed. While the illustrated embodiment has shown the dispensing of a cup-shaped member, it will be readily understood that any such member having a concavity therein, nested one within another essentially identical member, would lend itself to the practice of the disclosed invention by effecting obvious variation of the shape of the dispensing portion in contact with such member. Accordingly, in order to understand the scope of the present invention, reference should be made to the appended claims.

I claim:
1. The method of separating and dispensing cup-like members individually from a nested stack thereof comprising the steps of:
   a) securing said nested stack to present for withdrawal therefrom one of said members while providing access to the cup-like interior of said member,
   b) inserting a suction source into said cup-like interior to cause said interior to adhere to said suction source,
   c) withdrawing said suction source and said cup-like member from said stack,
   d) providing a source of positive air pressure and directing said pressure toward said stack immediately adjacent to said cup-like member as it is withdrawn from said stack,
   e) said positive pressure acting to separate the withdrawn member from the next adjacent member in the stack and acting to return said next adjacent member into nesting relation with said stack where said member through frictional engagement with the withdrawn member has become disengaged from said stack,
   f) said suction source being directed laterally within said cup-like interior and said positive pressure directed generally perpendicular to said suction source.

2. The method according to claim 1 wherein said withdrawn cup-like member is transported to be deposited into a bakery receptacle and said positive pressure source is used to eject said member from said suction source into said receptacle.

3. The method according to claim 2 wherein said cup-like members are generally frusto-conical in shape and have fluted sidewalls joined by a flat base.

4. An apparatus for separating and dispensing cup-like members individually from a nested stack thereof comprising:
   a) means for securing said nested stack to present for withdrawal therefrom one of said members while providing access to the cup-like interior of said member,
   b) suction means and means for insertion of said suction means into said cup-like interior to cause said member to adhere to said suction means,
   c) means to withdraw said suction means and said member from said stack,
   d) positive air pressure means and means for directing said positive air pressure means toward said stack immediately adjacent to said cup-like member as it is withdrawn from said stack,
   e) said positive air pressure means being of sufficient force and direction to effect separation of the withdrawn member from the next adjacent member in the stack and to return said next adjacent member into nesting relation with said stack if said member has been dislodged therefrom by engagement with the member being withdrawn,
   f) said suction means being directed laterally within said cup-like interior and said positive pressure directed generally perpendicular to said suction means.

5. The apparatus according to claim 4 wherein means are provided to transport said cup-like member after withdrawal of the member from said stack to a dispensing station, and means for controlling said suction means and said positive pressure means to respectively release and dispense said member at said station.

* * * * *